United States Patent
Mishra et al.

(10) Patent No.: US 12,034,469 B2
(45) Date of Patent: Jul. 9, 2024

(54) VARIABLE STRIDE COUNTING FOR TIMED-TRIGGERS IN A RADIO FREQUENCY FRONT END (RFFE) BUS

(71) Applicant: QUALCOMM Incorporated, San Diego, CA (US)

(72) Inventors: Lalan Jee Mishra, San Diego, CA (US); Richard Dominic Wietfeldt, San Diego, CA (US); Umesh Srikantiah, San Diego, CA (US); Karthik Manivannan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 783 days.

(21) Appl. No.: 17/127,709

(22) Filed: Dec. 18, 2020

(65) Prior Publication Data
US 2022/0200650 A1 Jun. 23, 2022

(51) Int. Cl.
| | |
|---|---|
| H04W 48/18 | (2009.01) |
| G06F 13/40 | (2006.01) |
| G06F 13/42 | (2006.01) |
| H04B 1/401 | (2015.01) |
| H04W 88/06 | (2009.01) |

(52) U.S. Cl.
CPC ......... H04B 1/401 (2013.01); G06F 13/4027 (2013.01); G06F 13/4291 (2013.01)

(58) Field of Classification Search
CPC .. H04B 1/401; G06F 13/4027; G06F 13/4291
See application file for complete search history.

(56) References Cited

U.S. PATENT DOCUMENTS

| | | | |
|---|---|---|---|
| 2017/0041127 A1* | 2/2017 | Sharpe-Geisler | ... G06F 13/4291 |
| 2018/0032457 A1* | 2/2018 | Mishra | .................. G06F 13/404 |
| 2019/0073327 A1 | 3/2019 | Mishra et al. | |
| 2019/0347239 A1 | 11/2019 | Mishra et al. | |
| 2020/0133910 A1 | 4/2020 | Rodd et al. | |

OTHER PUBLICATIONS

International Search Report and Written Opinion for International Patent Application No. PCT/US2021/072110, mailed Mar. 9, 2022, 18 pages.

* cited by examiner

*Primary Examiner* — Moustapha Diaby
(74) *Attorney, Agent, or Firm* — W&T/Qualcomm (57) ABSTRACT

Systems and methods for variable stride counting for timed-triggers in a radio frequency front end (RFFE) bus modify how a master clock controls counters in slaves. In particular, instead of having the master clock change a counter at a slave device on a one-to-one clock tick-to-counter change, exemplary aspects of the present disclosure contemplate allowing a bus ownership master (BOM) to select a stride size wherein each clock tick causes the counter to change by the size of the stride. Clock ticks are then sent less frequently over the clock line of the RFFE bus. In this fashion, fewer clock ticks are required to change the counter to the trigger event.

22 Claims, 8 Drawing Sheets

VARIABLE STRIDE COUNTING FOR TIMED-TRIGGERS IN A RADIO FREQUENCY FRONT END (RFFE) BUS

BACKGROUND

I. Field of the Disclosure

The technology of the disclosure relates generally to circuits having trigger events such as a wireless communication device having trigger events based on a wireless communication protocol.

II. Background

Computing devices abound in modern society. The prevalence of these mobile communication devices is driven in part by the many functions that are now enabled on such devices. Increased processing capabilities in such devices means that mobile communication devices have evolved from pure communication tools into sophisticated mobile entertainment centers, thus enabling enhanced user experiences.

Most such mobile communication devices have a suite of circuits coupled to one another by a bus to serve as a radio front end. The MIPI® Alliance has promulgated a standard to make devices associated with such radio front ends compatible. This standard is descriptively named the Radio Frequency Front End Control Interface (RFFE). The standard was initially released in July 2010 as v.1.00.00. Subsequently, RFFE has been updated to accommodate 5G communication requirements. In particular, RFFE 3.0 has introduced the concept of a Timed-Trigger that permits reduction in control latency. The Timed-Trigger may require use of an active clock signal for extended periods of time as counters used to track triggers are decremented (or incremented) based on a clock signal.

SUMMARY OF THE DISCLOSURE

Aspects disclosed in the detailed description include systems and methods for variable stride counting for timed-triggers in a radio frequency front end (RFFE) bus. In particular, instead of having a master clock change a counter at a slave device on a one-to-one clock tick-to-counter change, exemplary aspects of the present disclosure contemplate allowing a bus ownership master (BOM) to select a stride size wherein each clock tick causes the counter to change by the size of the stride. Clock ticks are then sent less frequently over the clock line of the RFFE bus. In this fashion, fewer clock ticks are required to change the counter to a trigger event. By reducing a number of clock ticks required to reach the trigger event, dynamic power consumption may be reduced, thereby extending battery life for a mobile terminal that includes the RFFE bus.

In this regard, in one aspect, an IC is disclosed. The IC includes a two-wire bus interface coupled to a two-wire bus. The IC also includes a clock source operative to produce a clock signal having a clock cycle. The clock source produces a clock tick once per clock cycle. The IC also includes a control circuit. The control circuit is configured to set a stride length including a plurality of clock cycles. The control circuit is also configured to send only one clock tick from the clock source through the two-wire bus interface per stride length.

In another aspect, an IC is disclosed. The IC includes a two-wire bus interface coupled to a two-wire bus. The IC also includes a triggered element. The IC also includes a counter configured to change values based on clock ticks received through the two-wire bus interface. The IC also includes a control circuit. The control circuit is configured to receive a stride length from a master, wherein the stride length corresponds to a plurality of clock cycles. The control circuit is also configured to cause the counter to change by the plurality of clock cycles on receipt of a clock tick over the two-wire bus interface.

In another aspect, an RFFE system is disclosed. The RFFE system includes an RFFE bus. The RFFE system also includes a master IC. The master IC includes a master RFFE bus interface coupled to the RFFE bus. The master IC also includes a clock source operative to produce a clock signal having a clock cycle. The clock source produces a clock tick once per clock cycle. The master IC also includes a master control circuit. The master control circuit is configured to set a stride length comprising a plurality of clock cycles. The master control circuit is also configured to send only one clock tick from the clock source through the RFFE bus per stride length. The RFFE system also includes a slave IC. The slave IC includes a slave RFFE bus interface coupled to the RFFE bus. The slave IC also includes a triggered element. The slave IC also includes a counter configured to change values based on clock ticks received through the RFFE bus. The slave IC also includes a slave control circuit. The slave control circuit is configured to receive the stride length from the master IC. The slave control circuit is also configured to cause the counter to change by the plurality of clock cycles on receipt of the one clock tick over the slave RFFE bus interface.

In another aspect, a method for controlling a counter in a slave is disclosed. The method includes setting a stride length at a master. The method also includes sending the stride length to the slave in a datagram. The method also includes adjusting the counter in the slave by the stride length at a clock tick sent by the master to the slave.

DETAILED DESCRIPTION

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include systems and methods for variable stride counting for timed-triggers in a radio frequency front end (RFFE) bus. In particular, instead of having a master clock change a counter at a slave device on a one-to-one clock tick to counter change, exemplary aspects of the present disclosure contemplate allowing a bus ownership master (BOM) to select a stride size wherein each clock tick causes the counter to change by the size of the stride. Clock ticks are then sent less frequently over the clock line of the RFFE bus. In this fashion, fewer clock ticks are required to change the counter to the trigger event. By reducing a number of clock ticks required to reach a trigger event, dynamic power consumption may be reduced, thereby extending battery life for a mobile terminal that includes the RFFE bus.

Figure 1:
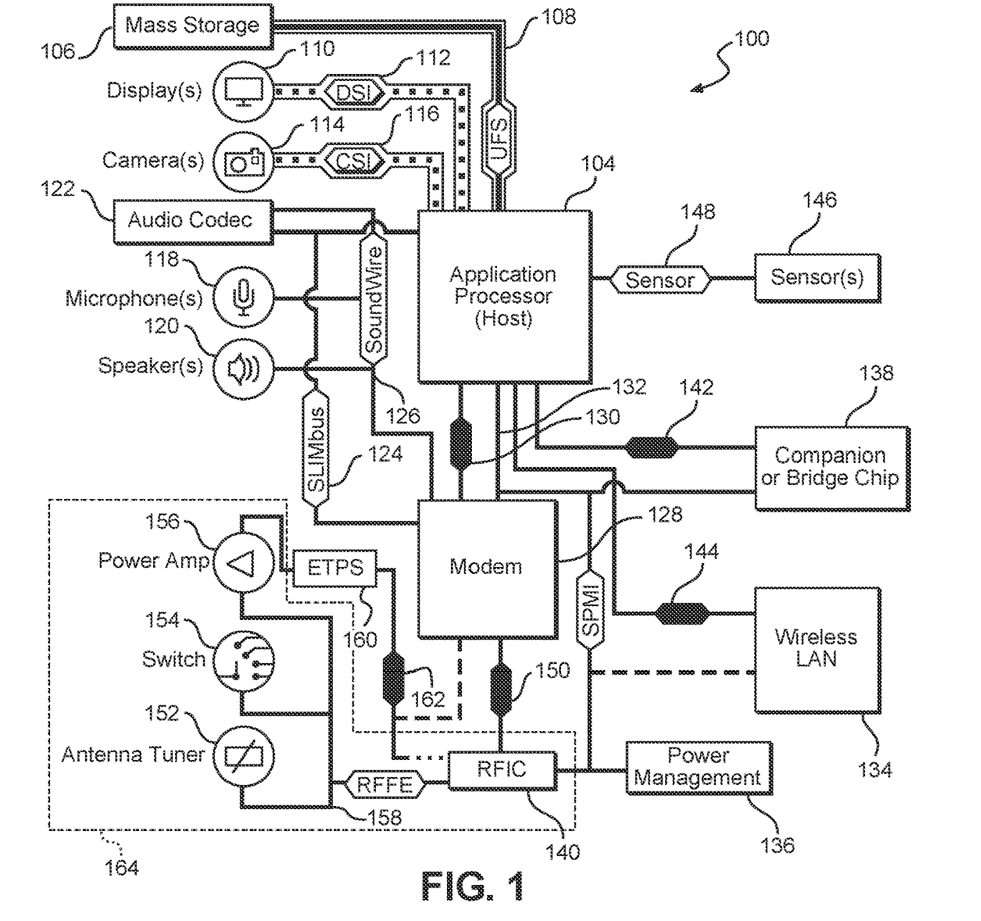
FIG. 1 is a block diagram of an exemplary wireless communication device having a radio frequency front end (RFFE) system with an RFFE bus.
Figure 2:
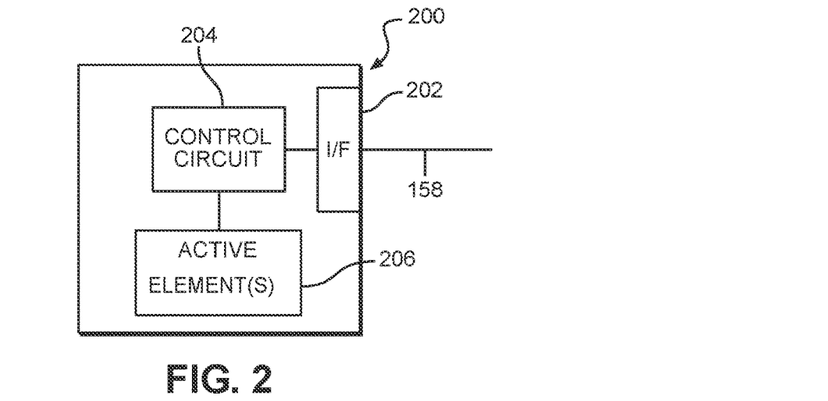
FIG. 2 is a block diagram of an RFFE slave that may be associated with the RFFE bus of FIG. 1.
Figure 3A:
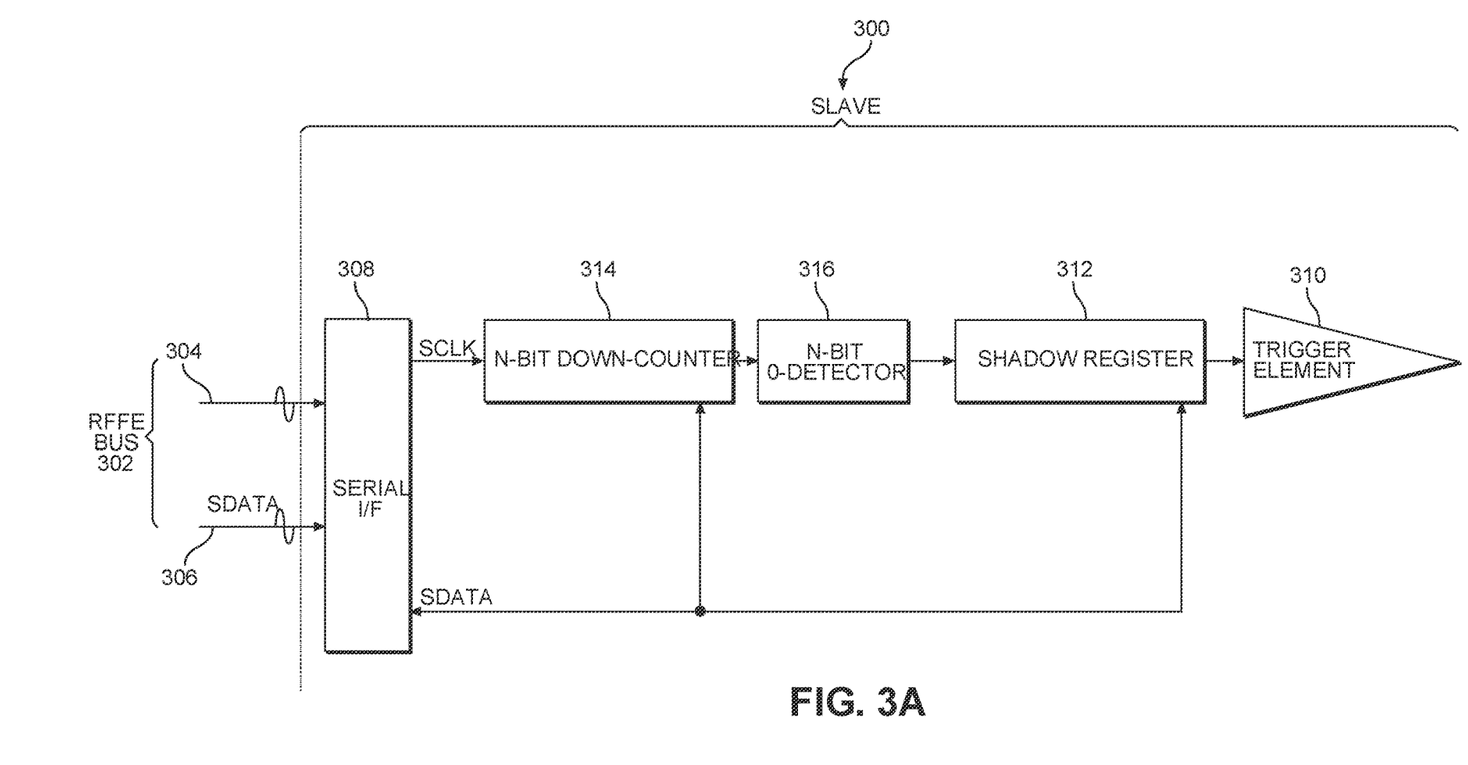
FIG. 3A is a simplified block diagram of a conventional RFFE slave having a single counter for a given triggered circuit.
Figure 3B:
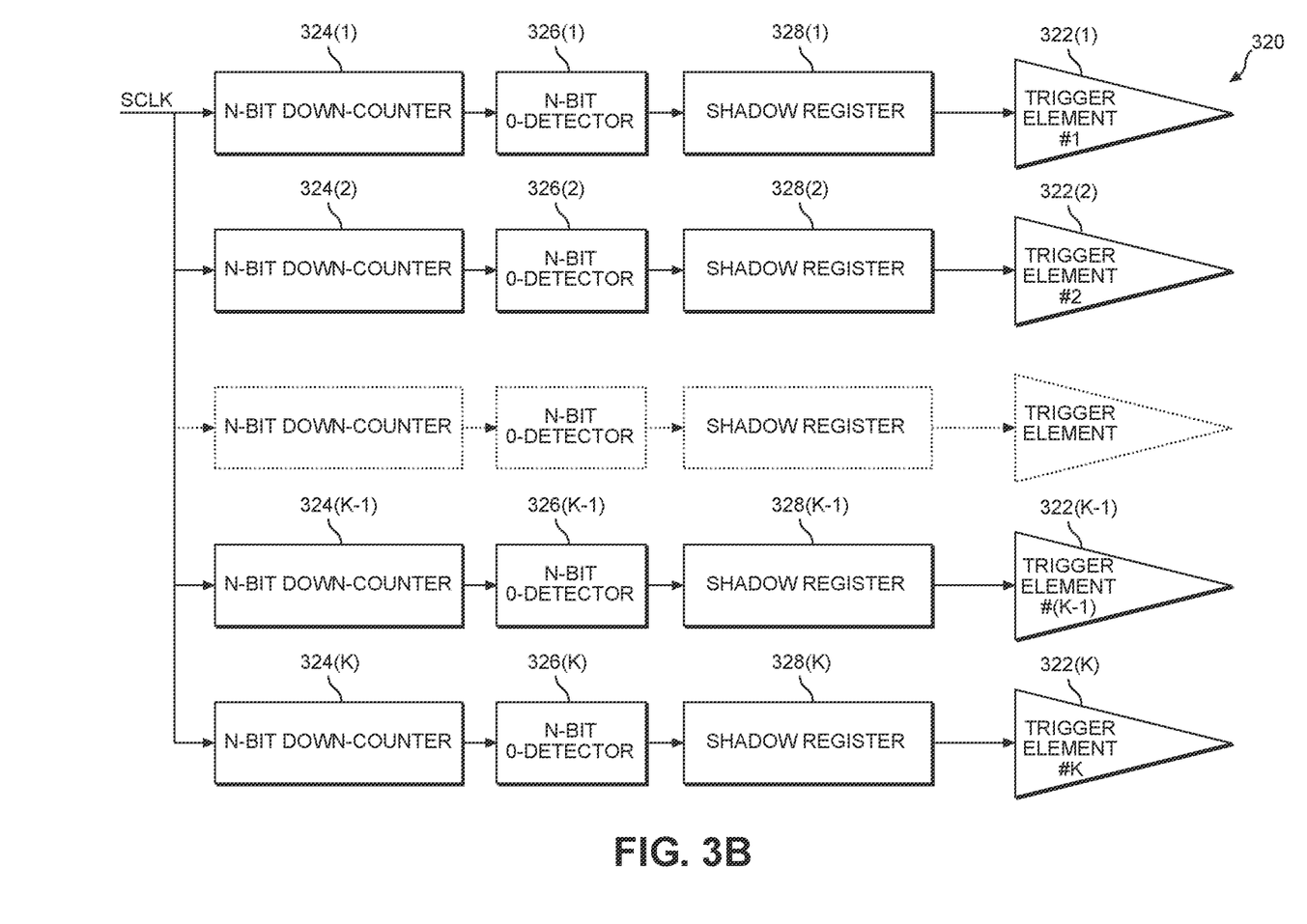
FIG. 3B is a simplified block diagram of a conventional RFFE slave having multiple triggered elements, each having a dedicated counter and detector.

To understand the context of the present disclosure, an overview of a computing device that includes an RFFE system including an RFFE bus is provided in FIG. 1, with more detailed descriptions of slaves on the RFFE bus described in FIGS. 2-3B. A description of an RFFE system that may use the variable stride clock signal of the present disclosure begins below with reference to FIG. 4.

In this regard, FIG. 1 is a system-level block diagram of an exemplary computing device and in particular a mobile terminal 100 such as a smart phone, mobile computing device, tablet, or the like. The mobile terminal 100 includes an application processor 104 (sometimes referred to as a host) that communicates with a mass storage element 106 through a universal flash storage (UFS) bus 108. The application processor 104 may further be connected to a display 110 through a display serial interface (DSI) bus 112 and a camera 114 through a camera serial interface (CSI) bus 116. Various audio elements such as a microphone 118, a speaker 120, and an audio codec 122 may be coupled to the application processor 104 through a serial low-power interchip multimedia bus (SLIMbus) 124. Additionally, the audio elements may communicate with each other through a SOUNDWIRE bus 126. A modem 128 may also be coupled to the SLIMbus 124 and/or the SOUNDWIRE bus 126. The modem 128 may further be connected to the application processor 104 through a peripheral component interconnect (PCI) or PCI express (PCIe) bus 130 and/or a system power management interface (SPMI) bus 132.

With continued reference to FIG. 1, the SPMI bus 132 may also be coupled to a wireless local area network (LAN or WLAN) integrated circuit (IC) (LAN IC or WLAN IC) 134, a power management integrated circuit (PMIC) 136, a companion IC (sometimes referred to as a bridge chip) 138, and a radio frequency IC (RFIC) 140. It should be appreciated that separate PCI buses 142 and 144 may also couple the application processor 104 to the companion IC 138 and the WLAN IC 134. The application processor 104 may further be connected to sensors 146 through a sensor bus 148. The modem 128 and the RFIC 140 may communicate using a bus 150.

With continued reference to FIG. 1, the RFIC 140 may couple to one or more RFFE elements, such as an antenna tuner 152, a switch 154, and a power amplifier 156 through an RFFE bus 158. Additionally, the RFIC 140 may couple to an envelope tracking power supply (ETPS) 160 through a bus 162, and the ETPS 160 may communicate with the power amplifier 156. Collectively, the RFFE elements, including the RFIC 140, may be considered an RFFE system 164. It should be appreciated that the RFFE bus 158 is a two-wire bus and may be formed from a clock line and a data line (not illustrated).

It should be appreciated that typically the RFIC 140 is considered the master or host of the RFFE system 164 and particularly the master of the RFFE bus 158. In contrast, the antenna tuner 152, the switch 154, and the power amplifier 156 are typically considered to be slaves for the RFFE system 164 and the RFFE bus 158. The most recent version of the RFFE standard was released in May 2020.

A generic RFFE slave 200, sometimes referred to as a slave circuit, is illustrated in FIG. 2. In particular, the RFFE slave 200 includes a bus interface (sometimes referred to as I/F) 202 that is configured to couple to the RFFE bus 158 or other comparable two-wire bus. The bus interface 202 is controlled by a control circuit 204, which may also control one or more active elements 206 (only one shown). The control circuit 204 may sometimes be referred to as a slave control circuit.

By way of example, the RFFE slave 200 may be the power amplifier 156, and the active elements 206 may be individual low noise amplifiers (LNAs) for different frequency bands. The active elements 206 may need to be triggered at certain times depending on which frequencies are being used to effectuate wireless communications (e.g., to or from a remote base station). In view of this need to activate or trigger the active elements 206, they are also referred to as triggered elements. The RFFE 3.0 standard introduces the concept of immediate triggers, which cause the triggered element to act immediately on receipt of the trigger command, and timed-triggers, which trigger triggered elements at specific subsequent times. It should further be appreciated that while the term "triggered elements" is used, an actual active element 206 is a circuit within an IC or chip that is the RFFE slave 200. While exemplary aspects of the RFFE slave 200 may include new circuit structures within the control circuit 204, the actual active elements 206 are generally conventional and well understood.

Individual counters and registers are generally provided for each active element 206 to track timed-trigger events. To assist in understanding this conventional system, FIG. 3A illustrates a slave 300 coupled to an RFFE bus 302. The RFFE bus 302 is further coupled to a host or master (not shown) and includes a clock line 304 and a data line 306. The clock line 304 carries a clock signal SCLK thereon, and the data line 306 carries a data signal SDATA thereon. The slave 300 is coupled to the RFFE bus 302 through a serial I/F 308. The slave 300 further includes a triggered element 310, which for the sake of example, may be an LNA. The triggered element 310 needs to be triggered at a precise time to amplify a signal that is being manipulated (e.g., transmitted or received) by an RFFE system (not shown). The host (still not shown) sends instructions and a timing value in the SDATA signal over the data line 306. The instructions are loaded into a shadow register 312, and the timing value is loaded into an N-bit down-counter 314. The SCLK signal causes the N-bit down-counter 314 to decrement down from the timing value loaded therein from the SDATA signal at a one-to-one ratio of clock ticks-to-changes in the N-bit down-counter 314. An N-bit 0-detector 316 detects when the N-bit down-counter 314 has been decremented down to zero (0) and, when 0 is reached, causes the contents of the shadow register 312 to be loaded into the triggered element 310. Equivalently, the N-bit down-counter 314 may be replaced with an up-counter that counts to a predefined threshold before loading the contents of the shadow register 312 to the triggered element 310.

Similarly, FIG. 3B illustrates a slave 320 that has multiple triggered elements 322(1)-322(K). For each of the multiple triggered elements 322(1)-322(K), there is a corresponding N-bit down-counter 324(1)-324(K), an N-bit 0-detector 326(1)-326(K), and a shadow register 328(1)-328(K). Again, the contents of the shadow registers 328(1)-328(K) are loaded from data in the SDATA signal (not shown in FIG. 3B) as are values for the N-bit down-counters 324(1)-324(K). Each N-bit down-counter 324(1)-324(K) is decremented by the SCLK signal. When a zero is detected by the corresponding one of the N-bit 0-detectors 326(1)-326(K), the contents of the corresponding shadow register 328(1)-328(K) are loaded into the respective triggered element 322(1)-322(K). Again, the triggered elements 322(1)-322(K) may be, for example, LNAs, each operating at different frequencies which are turned on to certain amplifications at different times.

Figure 4:
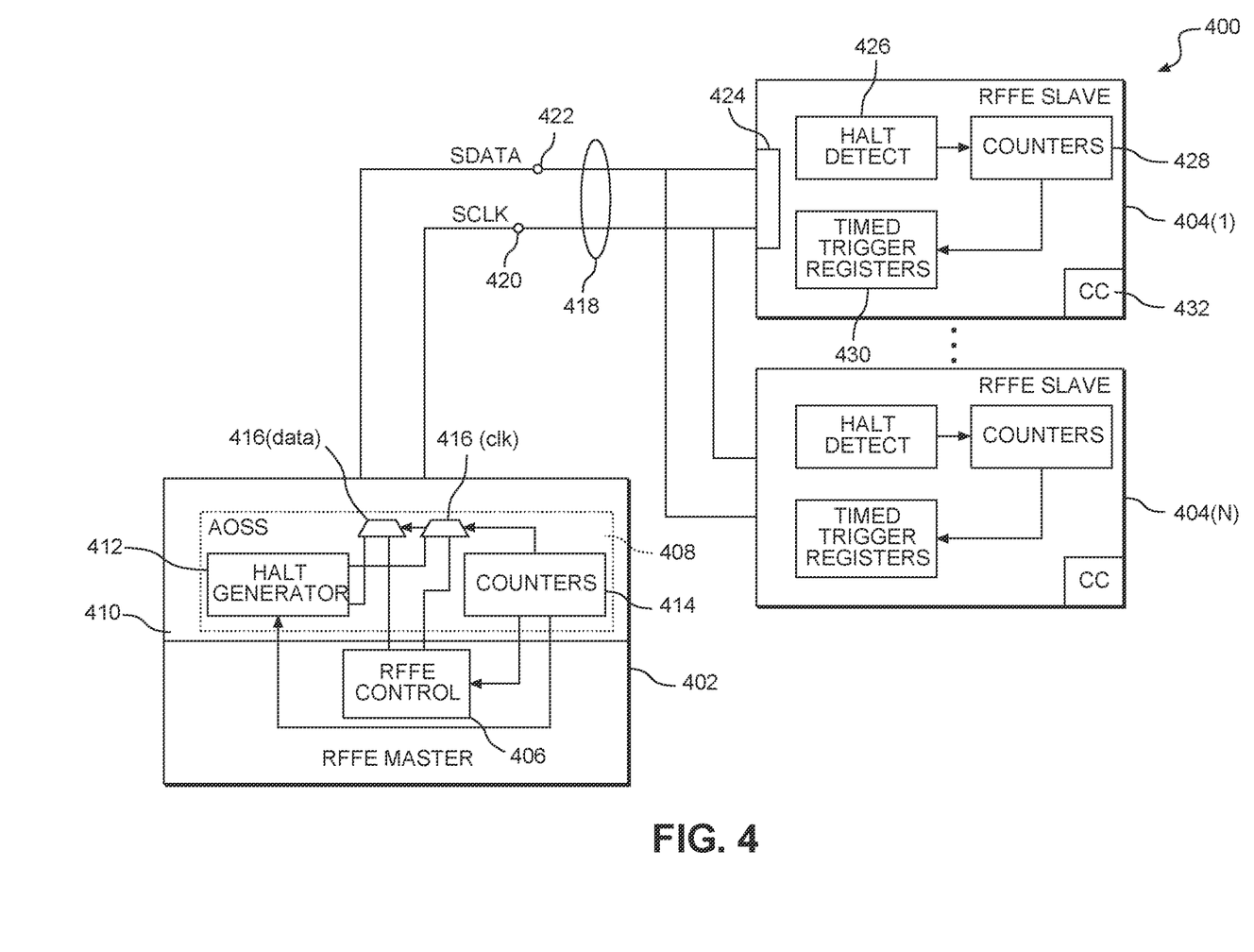
FIG. 4 is a block diagram of an RFFE system having a master and two slaves able to use nested commands according to an exemplary aspect of the present disclosure.

More generally FIG. 4 illustrates an RFFE system 400 with circuitry that allows a master 402 (sometimes referred to as master circuit) to set a stride length and communicate properties or variables of the stride to a slave 404(1)-404(N) that causes the slave 404(1)-404(N) to change counters therein by the stride length. The master 402 may include a control circuit 406 that is coupled to an always on subsystem (AOSS) 408 that is part of a bus interface 410, which is more specifically an RFFE bus interface and sometimes referred to as a master bus interface. The control circuit 406 may include a clock, be coupled to a clock, or control a clock (not shown). Such a clock may be referred to as a clock circuit or clock source. The AOSS 408 may include a halt generator circuit 412, a plurality of counters 414, and multiplexers 416(clk) and 416(data). The bus interface 410 is configured to be coupled to an RFFE bus 418 formed from a clock line (SCLK) 420 and a data line (SDATA) 422. The multiplexers 416(clk) and 416(data) are coupled to the clock line 420 and the data line 422, respectively.

With continued reference to FIG. 4, a given slave 404 such as slave 404(1) has a slave bus interface 424 configured to be coupled to the RFFE bus 418. The slave 404 may further have a halt detect circuit 426, counters 428, and timed-trigger registers 430. Additionally, the slave 404 may include a control circuit 432.

In use, the master 402 acts as a bus ownership master (BOM) that controls the RFFE bus 418. Commands are sent to a given slave 404 to cause the slave 404 to operate in a particular fashion (e.g., change frequency at a particular time, change power levels, or the like). Because some of the slaves 404(1)-404(N) may have limited (or no) counters 428 for use for timed-triggers, the master 402 may track triggers using the counters 414. When a counter 414 expires by reaching zero (if a count-down counter) or by reaching a threshold (if a count-up counter), the master 402 may need to send an immediate trigger command to a slave 404(1)-404(N) while an active process is ongoing.

Figure 5:
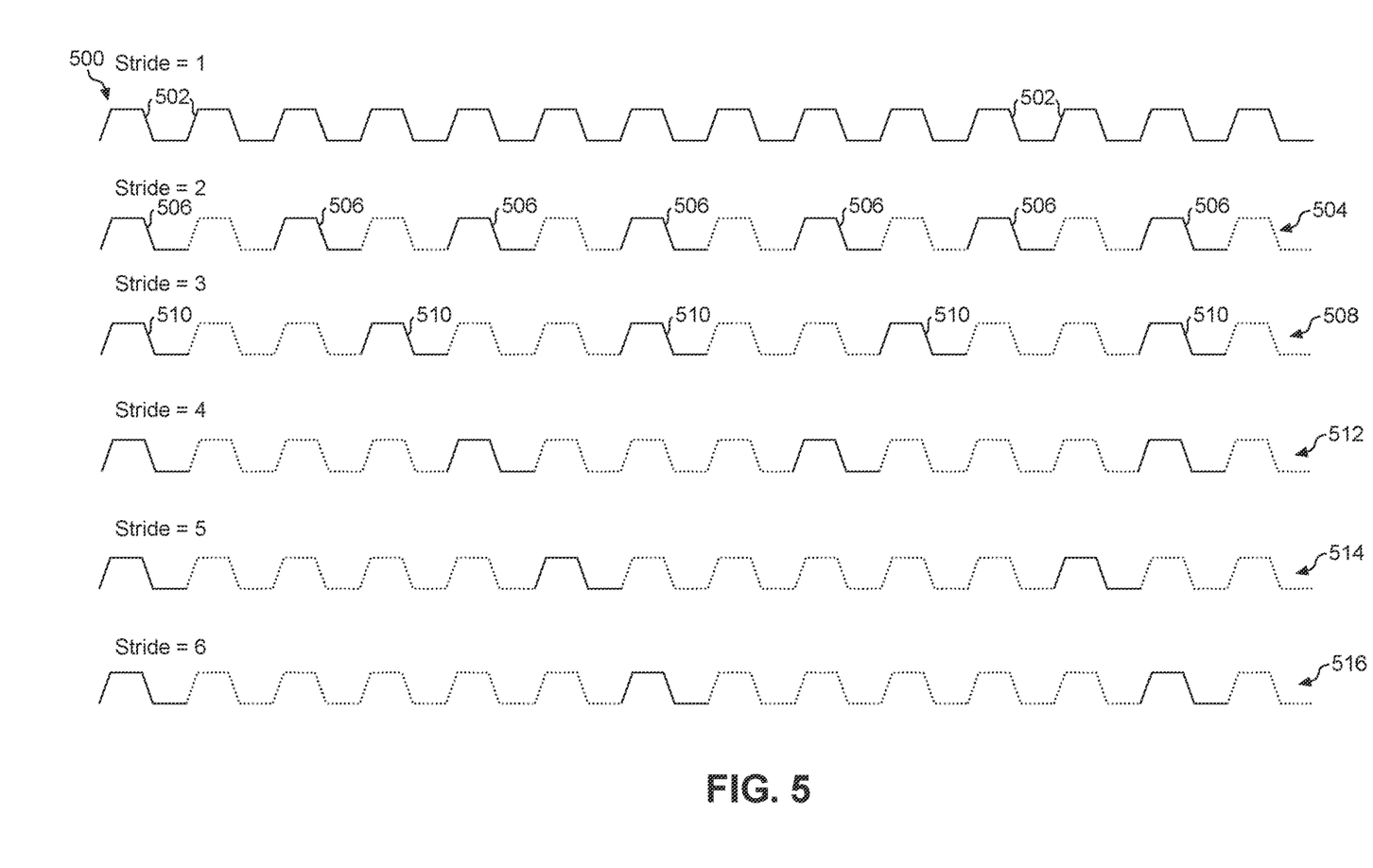
FIG. 5 shows various clock signals having different stride lengths, but the same clock cycle.

In a conventional RFFE system, the SCLK signal on the clock line 420 of the RFFE bus 418 has a one-to-one correspondence of clock tick-to-change in counters 428. When the counter is set at a large value, this means that a large number of clock ticks are sent over the clock line 420. By way of example, FIG. 5, shows a clock signal 500 having fourteen (14) clock ticks 502. While fourteen clock ticks 502 are illustrated, it should be appreciated that sometimes the counters are set at values of one hundred (100) or more. Each time the clock signal 500 has a clock tick 502, power is consumed by the line drivers. Exemplary aspects of the present disclosure allow fewer clock ticks to be sent while still changing the counters 428 at the slaves 404(1)-404(N) by a programmed stride length so as to cause the counters 428 to reach the trigger count at the appropriate time. For example, if a stride length of two (2) is selected, a clock signal 504 is generated with a clock tick 506 every other normal clock cycle resulting in a 50% power savings. Likewise, if a stride length of three (3) is selected, a clock signal 508 is generated with a clock tick 510 every third normal clock resulting in a 66% power savings. Signals 512, 514, and 516 are also illustrated showing stride lengths of four, five and six (4, 5, and 6), respectively, with the clock ticks spread out accordingly.

The master 402 may communicate the stride length and other stride variables in a datagram sent to the slaves 404(1)-404(N) at set up, or when the master 402 assumes BOM after a BOM change command. Note further that the stride may not be uniform, but may be dynamically adjusted by the master 402 sending another datagram to the slaves 404(1)-404(N) or by more extensive programming at set up. Additional variables may be, but are not necessarily limited to: the stride size, changes to stride size based on values loaded into a corresponding counter, an indication of whether the stride is a positive or negative value (to change a count-up versus a count-down timer), whether the change to the counter occurs at the positive edge of the clock tick, the negative edge of the clock tick, or both, and a definition of stride zones.

As used herein, a stride size is an integer value that dictates by what value a counter is changed. A stride size of one (1) corresponds to the conventional one-to-one clock tick-to-counter change arrangement of a conventional RFFE system. But, for example, a stride size of six (6) means that a counter changes its value (up or down) by six (6) each time a clock tick is received.

Figure 6:
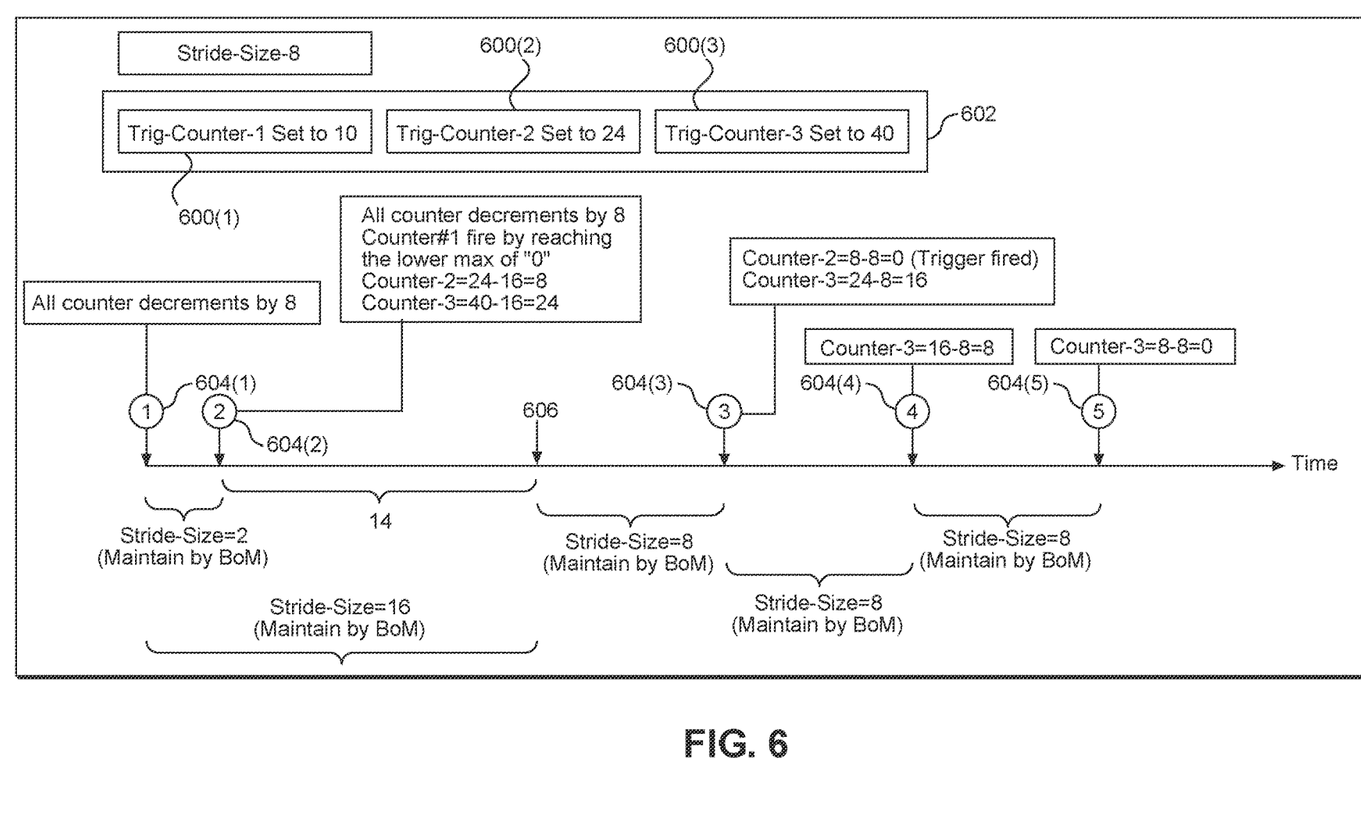
FIG. 6 shows a timeline relative to how three counters are changed as clock ticks using a stride length of eight are provided by a master over the RFFE bus.

A simple example using three counters 600(1)-600(3) in a slave 602 is provided in FIG. 6. For the sake of simplicity, it is assumed that each of the counters 600(1)-600(3) has a stride size of eight (8). A first counter 600(1) has a count of ten (10); a second counter 600(2) has a count of twenty-four (24); and a third counter 600(3) has a count of forty (40). In a conventional system, it would require forty (40) clock ticks for the third counter 600(3) to count down from forty (40) to zero (0) and trigger the triggered element. However, because the present disclosure allows for dynamic stride size programming, that value may be reduced to five (5) clock ticks, while all three counters trigger the triggered element at the appropriate time. Specifically, at a first clock tick 604(1), all the counters 600(1)-600(3) decrement by eight (8) (i.e., the stride size) (i.e., counters are at 2, 16, and 32, respectively). While the stride size is eight (8), the BOM master 402 has counters 414 concurrently tracking the count to the trigger event and "knows" that first counter 600(1) is supposed to trigger in two (2) normal ticks, not eight (8). Accordingly, the master 402 sends the next clock tick 604(2) at a trigger time, that is, in this example, a time two (2) clock cycles after the first clock tick 604(1) corresponding to when the triggered element is to be triggered. On receipt of the clock tick 604(2), all the counters 600(1)-600(3) decrement by eight (8) (even though only two clock cycles have occurred). The BOM master 402 does not send out a clock tick at time 606 corresponding to eight (8) clock cycles after the first clock tick 604(1) because the counters have already decremented for that time. The next clock tick 604(3) occurs fourteen (14) clock cycles after clock tick 604(2) and sixteen (16) clock cycles after the first clock tick 604(1). Counter 600(1) is inactive at this point, but counters 600(2), 600(3) decrement by the stride size eight (8), resulting in the counter 600(2) being at zero (0) and triggering the triggered element, while counter 600(3) is now at sixteen (16). Clock tick 604(4) occurs eight (8) clock cycles later. Counter 600(2) is now inactive, but counter 600(3) decrements by the stride size eight (8) to eight (8). Finally, at clock tick 604(5), thirty-two (32) clock cycles after the first clock tick 604(1), counter 600(3) decrements to zero (0) and triggers the triggered element.

The simple example of FIG. 6 is readily extrapolated to more counters and/or counters having different values than those described. Likewise, if other counters do not have count values that are integer multiples of the stride size, the BOM master 402 may likewise adjust when a clock tick is sent as it did for clock tick 604(2) so that the counters reach the trigger threshold at the appropriate time.

Thus, after the clock tick 604(2), the counters 600(1)-600(3) are at zero (0) (since negative six is not an option), eight (16-8), and 24 (32-8), respectively. The counter 600(1), having reached zero (0), triggers the triggered element.

In general, it should be appreciated that the stride size may be selected with an intention that the stride size corresponds to the largest common divisor shared between values loaded into the counters while still achieving desired power savings. This selection avoids the need to have clock ticks sent out of position as was done with the clock tick 604(2). Selection of such a stride size may be done, for example, when multiple counters are loaded with count values using a single datagram that further includes the stride size and any other stride parameters. Note further, that the counters do not necessarily need to have the same stride size. However, different stride sizes may require that the value loaded into the counter be adjusted. This may be appropriate where the values loaded into the counters do not have a reasonable largest common divisor to be used as a stride size.

Note also that if multiple counters have count values that trigger inside a single stride, the master 402 may signal through a datagram to the slaves 404(1)-404(N) that the stride size has been changed back to one (1) (i.e., the conventional stride) to handle such situations.

There may also be stride zones defined where so long as all count values on all counters are over a certain value, the stride is relatively large, but once the count value on one or more counters gets below a threshold, the stride changes to a shorter stride to accommodate the different count values. For example, if all count values are over fifty (50), then a stride size of ten (10) may be appropriate, but once a count is less than fifty (50), a stride of five (5) or three (3) may be more appropriate.

As noted above, the datagram that sets the stride may also set whether the stride is positive or negative depending on whether the counters are count-up or count-down counters. Likewise, the datagram that sets the stride may indicate an edge count instruction (e.g., whether the counters decrement/increment based on a rising edge or falling edge of the clock tick).

Figure 7:
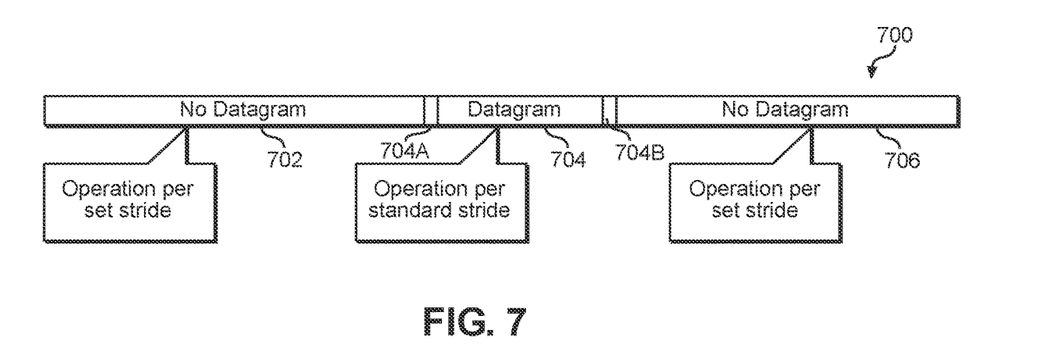
FIG. 7 is a timeline showing how a datagram may be interleaved with the expanded stride clock ticks over the RFFE bus.

The stride length may also change when a new datagram is generated and sent during a stride operation. This situation is illustrated in FIG. 7, where a signal flow 700 is shown. The signal flow 700 starts in a stride mode 702 where a clock tick is sent less frequently than once a clock cycle as described above. When the master 402 has a datagram 704 to send to a slave 404, an initial message 704A may be sent which instructs the slaves 404(1)-404(N) to switch back to a standard 1-1 stride, the datagram 704 is sent, and then a follow-on message 704B is sent instructing the slaves 404(1)-404(N) to return to a larger stride size mode 706. While messages 704A and 704B are specifically contemplated, it is possible that the mere presence of an active signal on the data line of the RFFE bus indicates the stride switch to the slaves 404(1)-404(N) or there may be other ways to indicate the change without departing from the present disclosure.

Figure 8:
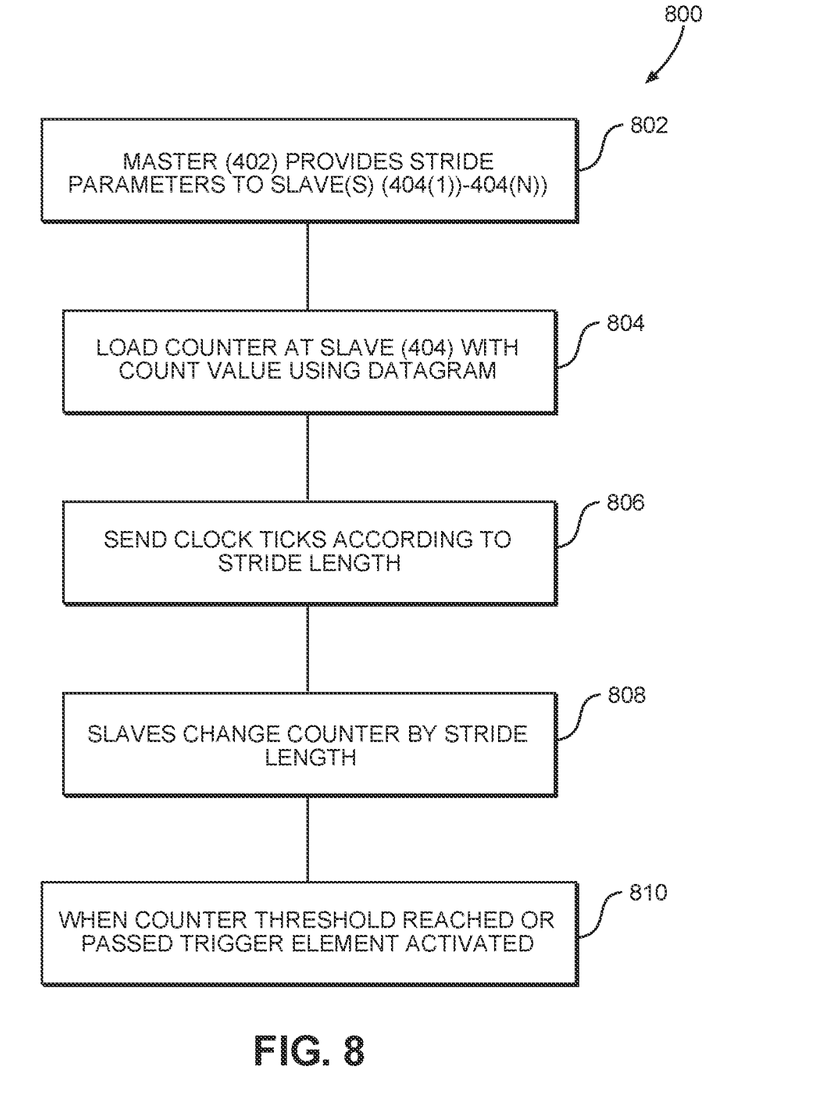
FIG. 8 is a flowchart illustrating exemplary processes for using an expanded stride length according to exemplary aspects of the present disclosure.

FIG. 8 provides a flowchart of a process 800 associated with the dynamic stride length of the present disclosure. In this regard, the process 800 begins at set up or a BOM transfer when the master 402 provides stride parameters to the slaves 404(1)-404(N) (block 802). Subsequently, the master 402 loads a counter at a slave 404 with a count value using a datagram (block 804). The master 402 sends clock ticks according to the stride length (block 806). For example, each clock tick may represent a stride size of eight (8) (although other values may be chosen). The slave(s) 404(1)-404(N) change counters by the stride length (block 808) for every clock tick received. When the counter threshold is reached or passed, the slave activates the triggered element (block 810). As noted above, use of the stride may be varied if additional datagrams are sent by the master or a counter at a slave is below a certain value.

The RFFE bus having dynamic stride size according to aspects disclosed herein may be provided in or integrated into any processor-based device. Examples, without limitation, include a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a server, a computer, a portable computer, a mobile computing device, a wearable computing device (e.g., a smart watch, a health or fitness tracker, eyewear, etc.), a desktop computer, a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The devices described herein may be employed in any circuit, hardware component, IC, or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

Implementation examples are described in the following numbered aspects:

1. An integrated circuit (IC) comprising:
   a two-wire bus interface coupled to a two-wire bus;
   a clock source operative to produce a clock signal having a clock cycle, the clock source producing a clock tick once per clock cycle; and
   a control circuit configured to:
     set a stride length comprising a plurality of clock cycles; and
     send only one clock tick from the clock source through the two-wire bus interface per stride length.

2. The IC of aspect 1, wherein the two-wire bus interface comprises a radio frequency front end (RFFE) bus interface.
3. The IC of aspect 1 or 2, wherein the control circuit is configured to operate as a bus ownership master (BOM) for an RFFE system.
4. The IC of any one of the aspects 1 to 3, wherein the control circuit is further configured to generate a datagram with stride parameters and send the datagram with the stride parameters to a slave device through the two-wire bus interface.
5. The IC of aspect 4, wherein at least one stride parameter comprises a stride direction, wherein the stride direction provides an instruction for a remote counter to count up or count down.
6. The IC of aspect 4, wherein at least one stride parameter comprises an edge count instruction indicating to a remote counter to count based on a rising edge or a falling edge.
7. The IC of any one of the aspects 1 to 6, wherein the control circuit is further configured to use a counter to track a second counter in a remote slave.
8. The IC of aspect 7, wherein the control circuit is further configured to vary the stride length based on the counter.
9. The IC of any one of the aspects 1 to 8, wherein the control circuit is further configured to change a stride size while sending a datagram to a remote slave through the two-wire bus interface.
10. The IC of any one of the aspects 1 to 9, wherein the control circuit is further configured to send the one clock tick to a remote slave at a trigger time.
11. The IC of any one of the aspects 1 to 10 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
12. An integrated circuit (IC) comprising:
    a two-wire bus interface coupled to a two-wire bus;
    a triggered element;
    a counter configured to change values based on clock ticks received through the two-wire bus interface; and
    a control circuit configured to:
      receive a stride length from a master, wherein the stride length corresponds to a plurality of clock cycles; and
      cause the counter to change by the plurality of clock cycles on receipt of a clock tick over the two-wire bus interface.
13. The IC of aspect 12, wherein the two-wire bus interface comprises a radio frequency front end (RFFE) bus interface.
14. The IC of aspect 12 or 13, wherein the triggered element comprises a low noise amplifier (LNA).

15. The IC of any one of the aspects 12 to 14, wherein the control circuit is configured to receive the stride length as a datagram from the master.
16. The IC of aspect 15, wherein the datagram further includes at least one stride parameter.
17. The IC of aspect 16, wherein the at least one stride parameter comprises an indication that the counter is to count down on the receipt of the clock tick or count up on the receipt of the clock tick.
18. The IC of aspect 16, wherein the at least one stride parameter comprises an indication that the counter is to count based on a rising edge or count based on a falling edge.
19. The IC of any one of the aspects 15 to 18, wherein the control circuit is configured to receive a second datagram without using the stride length.
20. The IC of any one of the aspects 12 to 19 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
21. A radio frequency front end (RFFE) system comprising:
    an RFFE bus;
    a master integrated circuit (IC) comprising:
        a master RFFE bus interface coupled to the RFFE bus;
        a clock source operative to produce a clock signal having a clock cycle, the clock source producing a clock tick once per clock cycle; and
        a master control circuit configured to:
            set a stride length comprising a plurality of clock cycles;
            send only one clock tick from the clock source through the RFFE bus per stride length; and
    a slave IC comprising:
        a slave RFFE bus interface coupled to the RFFE bus;
        a triggered element;
        a counter configured to change values based on clock ticks received through the RFFE bus; and
        a slave control circuit configured to:
            receive the stride length from the master IC; and
            cause the counter to change by the plurality of clock cycles on receipt of the one clock tick over the slave RFFE bus interface.
22. A method for controlling a counter in a slave, comprising:
    setting a stride length at a master;
    sending the stride length to the slave in a datagram; and
    adjusting the counter in the slave by the stride length at a clock tick sent by the master to the slave.

What is claimed is:
1. An integrated circuit (IC) comprising:
    a two-wire bus interface coupled to a two-wire bus;
    a clock source operative to produce a clock signal having a clock cycle, the clock source producing a clock tick once per clock cycle; and
    a control circuit configured to:
        set a stride length comprising a plurality of clock cycles; and
        send only one clock tick from the clock source through the two-wire bus interface per stride length.
2. The IC of claim 1, wherein the two-wire bus interface comprises a radio frequency front end (RFFE) bus interface.
3. The IC of claim 2, wherein the control circuit is configured to operate as a bus ownership master (BOM) for an RFFE system.
4. The IC of claim 1, wherein the control circuit is further configured to generate a datagram with stride parameters and send the datagram with the stride parameters to a slave device through the two-wire bus interface.
5. The IC of claim 4, wherein at least one stride parameter comprises a stride direction, wherein the stride direction provides an instruction for a remote counter to count up or count down.
6. The IC of claim 4, wherein at least one stride parameter comprises an edge count instruction indicating to a remote counter to count based on a rising edge or a falling edge.
7. The IC of claim 1, wherein the control circuit is further configured to use a counter to track a second counter in a remote slave.
8. The IC of claim 7, wherein the control circuit is further configured to vary the stride length based on the counter.
9. The IC of claim 1, wherein the control circuit is further configured to change a stride size while sending a datagram to a remote slave through the two-wire bus interface.
10. The IC of claim 1, wherein the control circuit is further configured to send the one clock tick to a remote slave at a trigger time.
11. The IC of claim 1 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.
12. An integrated circuit (IC) comprising:
    a two-wire bus interface coupled to a two-wire bus;
    a triggered element;
    a counter configured to change values based on clock ticks received through the two-wire bus interface; and
    a control circuit configured to:
        receive a stride length from a master, wherein the stride length corresponds to a plurality of clock cycles; and
        cause the counter to change by the stride length on receipt of a clock tick over the two-wire bus interface.
13. The IC of claim 12, wherein the two-wire bus interface comprises a radio frequency front end (RFFE) bus interface.
14. The IC of claim 12, wherein the triggered element comprises a low noise amplifier (LNA).

15. The IC of claim 12, wherein the control circuit is configured to receive the stride length as a datagram from the master.

16. The IC of claim 15, wherein the datagram further includes at least one stride parameter.

17. The IC of claim 16, wherein the at least one stride parameter comprises an indication that the counter is to count down on the receipt of the clock tick or count up on the receipt of the clock tick.

18. The IC of claim 16, wherein the at least one stride parameter comprises an indication that the counter is to count based on a rising edge or count based on a falling edge.

19. The IC of claim 15, wherein the control circuit is configured to receive a second datagram without using the stride length.

20. The IC of claim 12 integrated into a device selected from the group consisting of: a set top box; an entertainment unit; a navigation device; a communications device; a fixed location data unit; a mobile location data unit; a global positioning system (GPS) device; a mobile phone; a cellular phone; a smart phone; a session initiation protocol (SIP) phone; a tablet; a phablet; a server; a computer; a portable computer; a mobile computing device; a wearable computing device; a desktop computer; a personal digital assistant (PDA); a monitor; a computer monitor; a television; a tuner; a radio; a satellite radio; a music player; a digital music player; a portable music player; a digital video player; a video player; a digital video disc (DVD) player; a portable digital video player; an automobile; a vehicle component; avionics systems; a drone; and a multicopter.

21. A radio frequency front end (RFFE) system comprising:
   an RFFE bus;
   a master integrated circuit (IC) comprising:
      a master RFFE bus interface coupled to the RFFE bus;
      a clock source operative to produce a clock signal having a clock cycle, the clock source producing a clock tick once per clock cycle; and
      a master control circuit configured to:
         set a stride length comprising a plurality of clock cycles;
         send only one clock tick from the clock source through the RFFE bus per stride length; and
   a slave IC comprising:
      a slave RFFE bus interface coupled to the RFFE bus;
      a triggered element;
      a counter configured to change values based on clock ticks received through the RFFE bus; and
      a slave control circuit configured to:
         receive the stride length from the master IC; and
         cause the counter to change by the plurality of clock cycles on receipt of the one clock tick over the slave RFFE bus interface.

22. A method for controlling a counter in a slave, comprising:
   setting a stride length at a master;
   sending the stride length to the slave in a datagram; and
   adjusting the counter in the slave by the stride length at a clock tick sent by the master to the slave.

* * * * *